United States Patent
Jung

(10) Patent No.: US 12,529,425 B2
(45) Date of Patent: Jan. 20, 2026

(54) IMPRESSION MATERIAL CARTRIDGE GASKET HAVING AIR VENT HOLE FORMED THEREIN

(71) Applicant: Hun Jung, Goyang-si (KR)

(72) Inventor: Hun Jung, Goyang-si (KR)

( * ) Notice: Subject to any disclaimer, the term of this patent is extended or adjusted under 35 U.S.C. 154(b) by 0 days.

(21) Appl. No.: 18/857,988

(22) PCT Filed: Mar. 7, 2023

(86) PCT No.: PCT/KR2023/003117
§ 371 (c)(1),
(2) Date: Oct. 18, 2024

(87) PCT Pub. No.: WO2023/204445
PCT Pub. Date: Oct. 26, 2023

(65) Prior Publication Data
US 2025/0271063 A1    Aug. 28, 2025

(30) Foreign Application Priority Data

Apr. 19, 2022    (KR) .................... 10-2022-0048379

(51) Int. Cl.
*F16J 15/34*    (2006.01)
*B65D 81/32*    (2006.01)
*A61C 9/00*    (2006.01)

(52) U.S. Cl.
CPC ........ *F16J 15/3404* (2013.01); *B65D 81/325* (2013.01); *A61C 9/0026* (2013.01)

(58) Field of Classification Search
CPC .......... F16J 15/164; F16J 9/08; F16J 15/3404
See application file for complete search history.

(56) References Cited

U.S. PATENT DOCUMENTS 2,614,793 A * 10/1952 Storm ........................ F16J 1/09
285/918
2,732,268 A * 1/1956 Duval ...................... F16J 15/46
277/587

(Continued)

FOREIGN PATENT DOCUMENTS

EP          2632606 B1    9/2013
KR   10-2010-0091893 A    8/2010

(Continued)

*Primary Examiner* — Vishal A Patel
(74) *Attorney, Agent, or Firm* — Rabin & Berdo, P.C.

(57) ABSTRACT

Provided is an impression material cartridge gasket including: a gasket body that moves up and down along the inner wall surface of a cylinder according to the charging and discharging of a liquid chemical; and a sealing member coupled to the outer circumferential surface of the gasket body. The gasket body includes: a contact jaw that is formed, protruding radially outward, along the height direction of a side wall and contacts the inner wall surface of the cylinder; an air retention groove which is recessed radially inward from the lower portion of the contact jaw and in which air is retained; and an accommodation groove which is recessed radially inward between the upper surface of the gasket body and the contact jaw and to which the sealing member is coupled. At least one air vent hole is provided on a plate surface of the contact jaw in a circumferential direction.

2 Claims, 6 Drawing Sheets

(56) References Cited

U.S. PATENT DOCUMENTS

| | | | | | |
|---|---|---|---|---|---|
| 2,892,645 | A | * | 6/1959 | Clarence | F16J 15/48 |
| | | | | | 277/467 |
| 3,647,226 | A | * | 3/1972 | Middelkoop | F16J 15/32 |
| | | | | | 277/580 |
| 5,094,368 | A | * | 3/1992 | Warehime | F16J 15/021 |
| | | | | | 222/630 |
| 9,243,715 | B2 | * | 1/2016 | Slack | F16J 15/48 |
| 10,543,508 | B2 | | 1/2020 | Obrist | |
| 2011/0089200 | A1 | | 4/2011 | Reuter | |

FOREIGN PATENT DOCUMENTS

| | | |
|---|---|---|
| KR | 10-1691053 B1 | 12/2016 |
| KR | 10-2017-0056661 A | 5/2017 |
| KR | 10-2020-0124912 A | 11/2020 |
| WO | 2008/021732 A1 | 2/2008 |

* cited by examiner (a)

(b)

IMPRESSION MATERIAL CARTRIDGE GASKET HAVING AIR VENT HOLE FORMED THEREIN

TECHNICAL FIELD

The present invention relates to an impression material cartridge gasket, and more particularly, to an impression material cartridge gasket having an air vent hole formed therein and configured to discharge, when an impression material is injected from a bottom portion of the impression material cartridge gasket, air remaining in the impression material cartridge gasket to the outside.

BACKGROUND ART

Impression taking in dental treatment refers to a process of making a negative likeness (a negative mold) in reverse of the surface of an object so as to copy the tooth and surrounding oral structures for replication thereof in the case of tooth loss or the like. Specifically, impression taking is a process of injecting an impression material into a tray fixed to the tooth and obtaining, after a certain period of time, a model of the tooth through the shape of the hardened impression material. An artificial tooth or a part of the tooth is produced through the negative mold obtained in this manner.

The material used to perform the impression taking is called a dental impression material. The impression material is a mixture of a liquid silicone base and a hardener. Here, when the silicone base and the hardener are mixed with each other, hardening speed thereof is accelerated. For this reason, an impression material cartridge including cylinders separately provided therein and configured to respectively accommodate a silicone base and a hardener is used.

After the impression material cartridge is filled with the silicone base and the hardener, the impression material cartridge is mounted on a dispenser gun when in use, and a mixing tip is coupled to a tip portion of the dispenser gun. Then, the silicone base and the hardener are mixed in the mixing tip, and an obtained mixture is injected around the tooth to be treated through the mixing tip.

FIG. 1 is an exemplary view showing a process of filling an impression material cartridge 10 with a silicone base L1 and a hardener L2.

As shown in FIG. 1, the impression material cartridge 10 includes a base cylinder 11 and a hardener cylinder 13 that are separately formed therein, in which the base cylinder accommodates the silicone base L1, and the hardener cylinder accommodates the hardener L2. Further, the base cylinder has a base discharge hole 11a provided at a bottom portion thereof, and the hardener cylinder has a hardener discharge hole 13a provided at a bottom portion thereof.

The base cylinder 11 and the hardener cylinder 13 have gaskets 20 respectively provided at the inner sides thereof. The gaskets 20 respectively block upper portions of the silicone base L1 and the hardener L2 that respectively fill the base cylinder and the hardener cylinder, thereby preventing leakage of pressure to the outside.

The impression material cartridge 10 is connected to an impression material injector 30, and a base injection nozzle 31 and a hardener injection nozzle 33 are connected to the base discharge hole 11a and the hardener discharge hole 13a, respectively. When the silicone base L1 and the hardener L2 are injected into the respective cylinders, support shafts 35 are moved upwards so as to correspond to the injection amount, and the gaskets 20 are also moved upwards in conjunction with upward movement of the support shafts 35.

However, in a case where the conventional impression material cartridge 10 is filled with the impression material, when air A is present between each of the base cylinder 11 and the hardener cylinder 13 and a corresponding one of the gaskets 20, the air A remains in each of the silicone base L1 and the hardener L2 after the impression material cartridge is completely filled with the impression material.

Accordingly, in a case where air remains in each of the silicone base and the hardener as described above, when the impression material is supplied around the tooth of a patient, a tooth impression model is not properly obtained. As a result, the obtained tooth impression model may have defects generated in the process of impression taking, and the same procedures need to be repeatedly performed to obtain a new tooth impression model.

DISCLOSURE

Technical Problem

Therefore, the present invention has been made in view of the above problems, and it is an object of the present invention to provide an impression material cartridge gasket configured to discharge, when an impression material is injected from a bottom portion of the impression material cartridge gasket through an impression material injector, air that is present between the bottom surface of the cylinder and the gasket to the outside, thereby preventing the air from remaining in the impression material.

The objects of the present disclosure are not limited to the above-mentioned objects, and other technical objects not mentioned herein will be clearly understood by those skilled in the art to which the present disclosure pertains from the detailed description of the preferred embodiments.

Technical Solution

In accordance with the present invention, the above and other objects can be accomplished by the provision of an impression material cartridge gasket including a gasket main body (110) moved upwards and downwards along an inner wall surface of a cylinder depending on injection and discharge of a liquid chemical, and a sealing member (120) coupled to an outer circumferential surface of the gasket main body (110) and configured to prevent leakage of the liquid chemical, wherein the gasket main body (110) includes a contact protrusion (115) formed to protrude radially outwards in a height direction of a side wall (113) and configured to contact the inner wall surface of the cylinder, an air residual groove (114) formed to be recessed radially inwards at a lower portion of the contact protrusion (115) and configured to allow air to remain therein, and an accommodation groove (117) formed to be recessed radially inwards between an upper surface of the gasket main body (110) and the contact protrusion (115), the accommodation groove allowing the sealing member (120) to be coupled thereto, and the contact protrusion (115) has at least one air vent hole (119) provided circumferentially on a plate surface thereof, wherein the at least one air vent hole is formed to be recessed toward the accommodation groove (117) by a predetermined depth so as to discharge the air remaining in the air residual groove (114) to an outside of the impression material cartridge gasket.

The accommodation groove (117) may be formed to have a height of 1.5 to 1.8 times a thickness of the sealing member (120), the air vent hole (119) may include an air inlet groove (119a) formed to be vertically recessed from the contact protrusion (115) toward the air residual groove (114), the air inlet groove allowing the air remaining in the air residual groove (114) to be introduced thereinto, an air movement groove (119c) formed to extend from the air inlet groove (119a), the air movement groove being recessed toward a plate surface of the accommodation groove (117), and an air discharge groove (119b) provided at an end portion of the air movement groove (119c) and formed to be open toward the accommodation groove (117), the air discharge groove discharging the air moved along the air movement groove (119c) to the outside of the impression material cartridge gasket, and the discharge groove (119b) may be formed to be higher than the thickness of the sealing member (120) from a bottom portion of the accommodation groove (117).

Advantageous Effects

The present invention provides an impression material cartridge gasket configured to form an air vent hole in a sealing member accommodation groove, and to discharge air remaining in the impression material cartridge gasket to the outside by using a time difference generated when a gasket main body and a sealing member are respectively moved by different frictional forces thereof.

As a result, since all the air remaining in the impression material cartridge gasket is discharged when an impression material is injected into an impression material cartridge, an additional process of discharging the air is not required in the subsequent process, thereby having an effect of preventing defects generated in the process of impression taking.

DESCRIPTION OF DRAWINGS

The above and other objects, features and other advantages of the present invention will be more clearly understood from the following detailed description taken in conjunction with the accompanying drawings, in which.

BEST MODE

Figure 1:
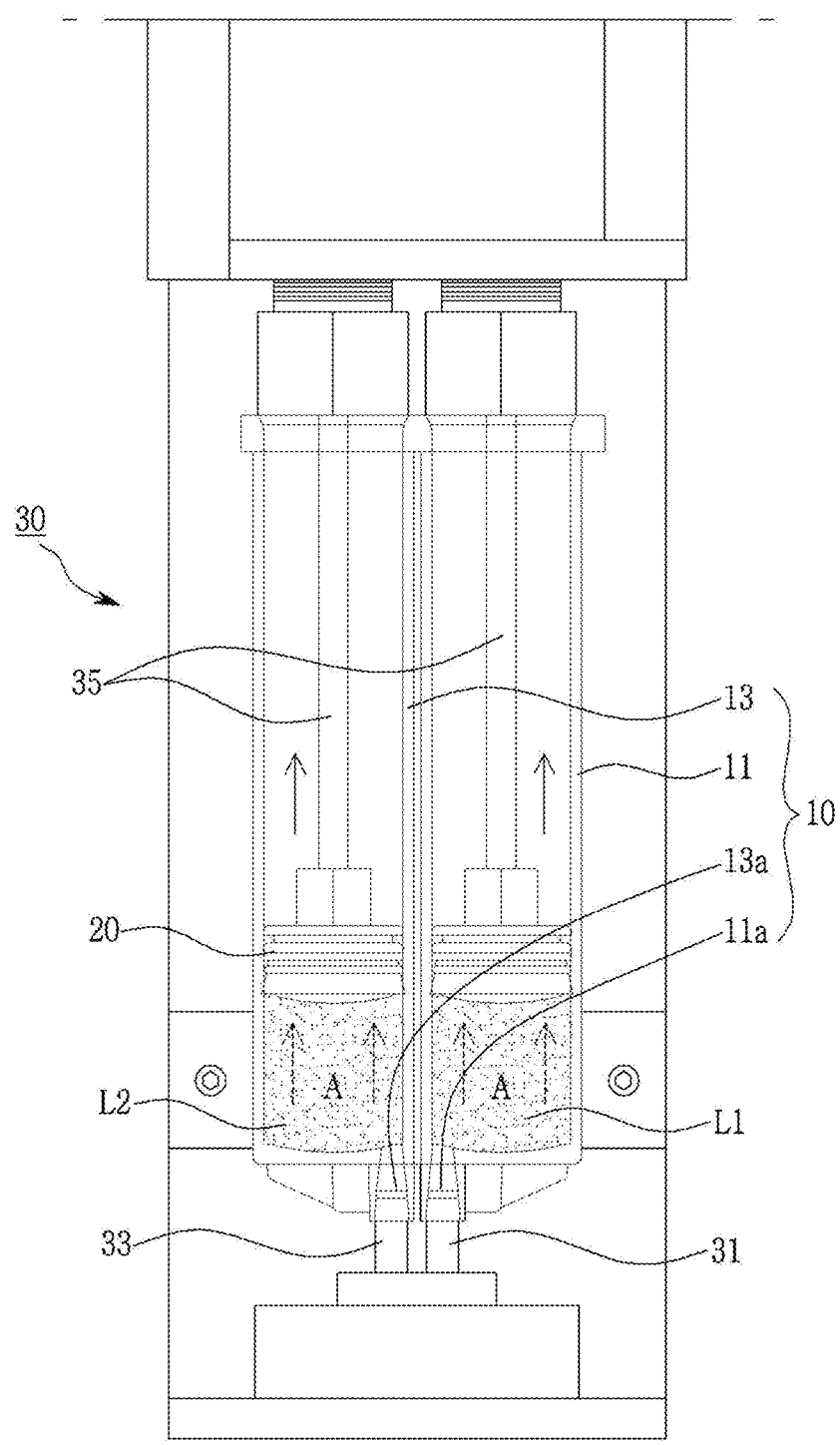
FIG. 1 is an exemplary view showing an impression material injection process of a conventional impression material cartridge.

In order to fully understand the present invention, a preferred embodiment of the present invention will be described with reference to the accompanying drawings. The embodiment of the present invention may be changed in various forms, and the scope of the present invention must not be interpreted as being limited to the following embodiment described below in detail. The present embodiment is provided to more completely describe the present invention to a person having ordinary skill in the art to which the present invention pertains. Consequently, the shapes and the like of elements in the drawings may be exaggerated for clearer description. It should be noted that identical members may be denoted by the same reference numerals in the drawings. A detailed description of related known functions and constructions will be omitted when the same may obscure the subject matter of the present invention.

Figure 2:
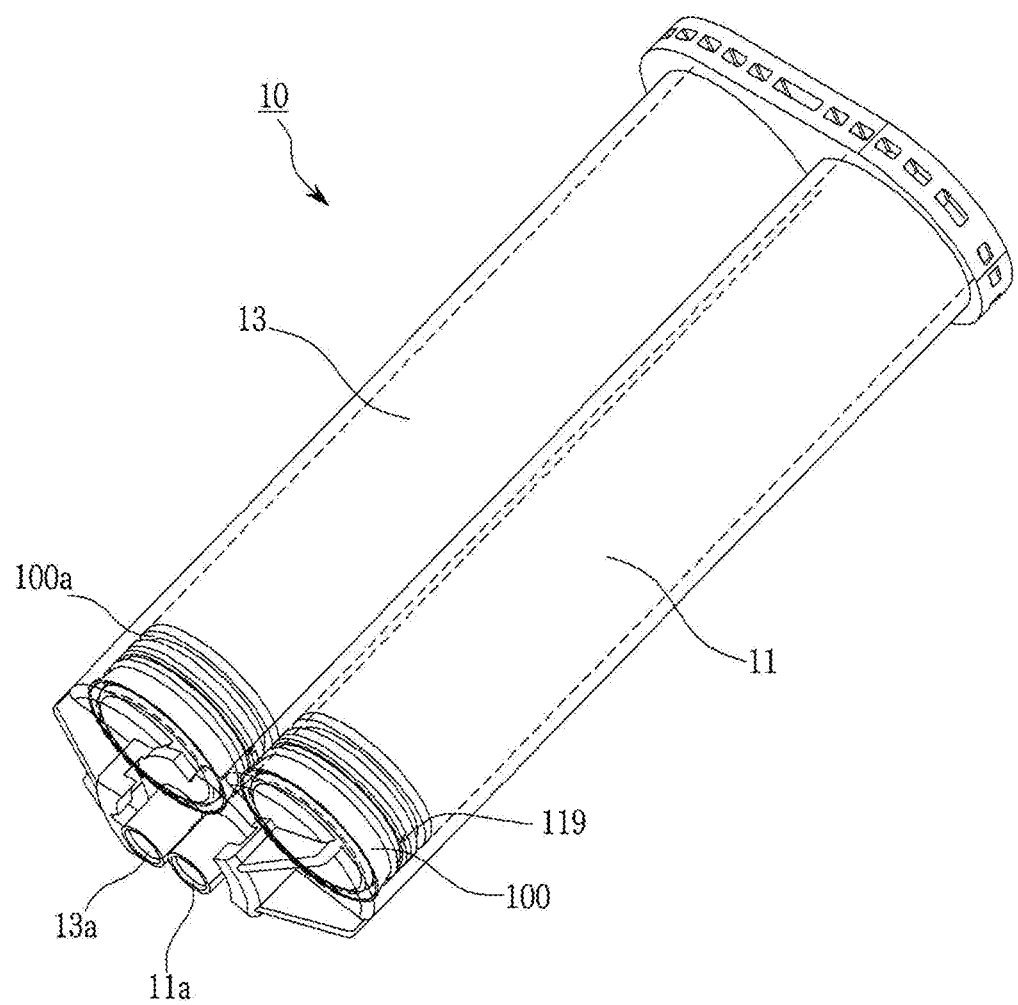
FIG. 2 is a perspective view showing a configuration of an impression material cartridge to which a gasket of the present invention is applied.
Figure 3:
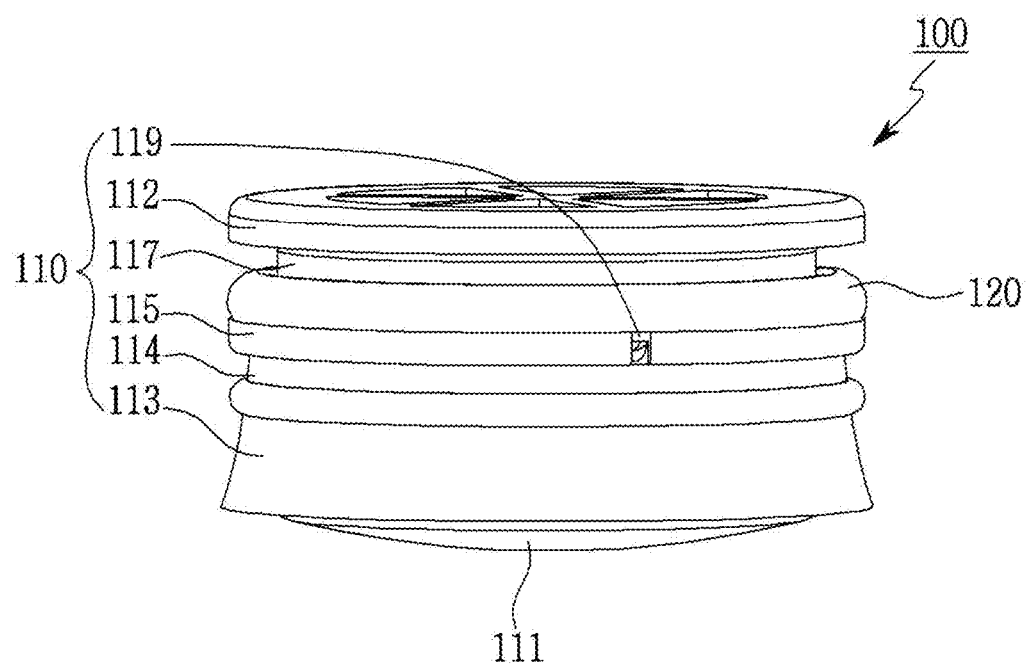
FIG. 3 is a perspective view showing a configuration of the gasket of the present invention.
Figure 4:
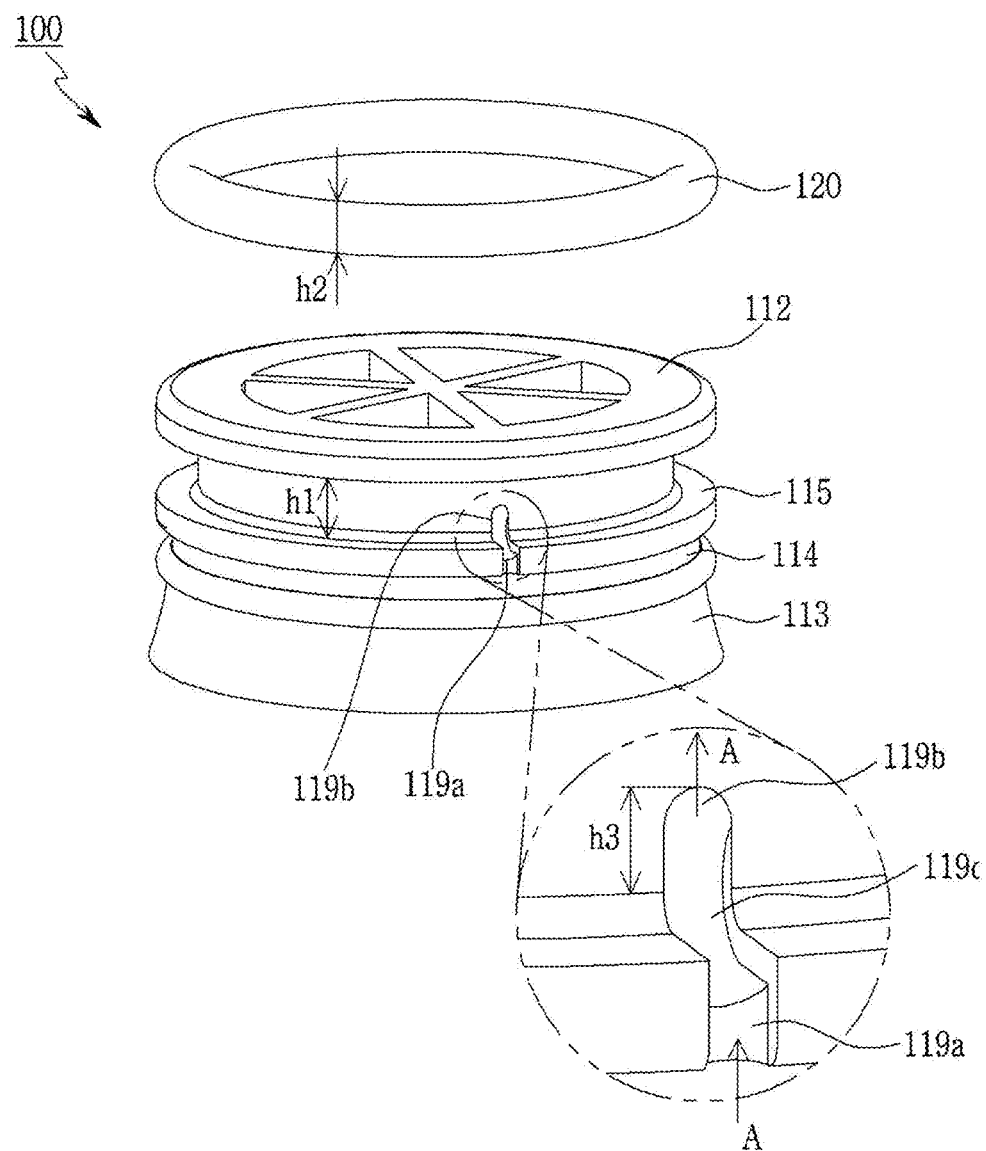
FIG. 4 is an exploded perspective view showing the configuration of the gasket of the present invention.

FIG. 2 is a perspective view showing a configuration of an impression material cartridge 10 to which gaskets 100 and 100a of the present invention are applied, FIG. 3 is a perspective view showing the configuration of each of the gaskets 100 and 100a of the present invention, and FIG. 4 is an exploded perspective view showing the configuration of each of the gaskets 100 and 100a of the present invention.

As shown in the drawings, the impression material cartridge 10 includes a base cylinder 11 filled with a silicon base L1 and a hardener cylinder 13 filled with a hardener L2, in which the base cylinder and the hardener cylinder are formed to be integrated with each other. The base cylinder 11 has a base discharge hole 11a provided at a tip portion thereof and formed to protrude from the tip portion, and the hardener cylinder 13 has a hardener discharge hole 13a provided at a tip portion thereof and formed to protrude from the tip portion.

A mixing tip (not shown) is coupled to the base discharge hole 11a and the hardener discharge hole 13a so as to cover the same. Here, the silicon base L1 and the hardener L2 are mixed in the mixing tip (not shown) so as to inject an impression material around the tooth of a patient.

The gaskets 100 and 100a are respectively provided in the base cylinder 11 and the hardener cylinder 13. As shown in FIGS. 3 and 4, the gaskets 100 and 100a of the present invention are formed by combining a gasket main body 110 with a sealing member 120 coupled to the outer peripheral surface of the gasket main body 110. In this case, the gasket main body 110 of the present invention has an air vent hole 119 formed therein and configured to discharge, when the impression material is injected into the impression material cartridge by the impression material injector 30 in FIG. 1, air A that is present between each of the bottom portions of the cylinders 11 and 13 and a corresponding one of the gaskets 100 and 100a by using a time difference movement between the gasket main body 110 and the sealing member 120.

As described, the air remaining in the impression material cartridge may be discharged to the outside through the air vent hole 119 when the impression material is injected into the impression material cartridge, thereby making it possible not only to eliminate an inconvenient process of discharging air using a process such as centrifugation after the impression material is completely injected into impression material cartridge, but also to maximally reduce defects caused by residual air generated in the process of impression taking.

The gasket main body 110 is provided to be movably in close contact with the inner wall surface of the base cylinder 11 or the hardener cylinder 13. The gasket main body 110 is formed to have a cylindrical shape overall and has a lower surface 111 formed to have a curved surface protruding downwards, a sidewall 113 formed to contact the inner wall surface of any one of the cylinders 11 and 13, and an upper plate 112 formed on an upper portion of the gasket main body.

In this case, the lower surface 111 is formed to have a curved shape protruding downwards so as to discharge, to the outside, the impression material filling the inside of the lower surface through a bottom portion thereof. The upper plate 112 is supported by the support shaft 35 in FIG. 1 when the impression material is injected and is supported by a dispenser gun when the impression material is discharged.

The side wall 113 has a contact protrusion 115 provided thereon and formed to protrude outwards in the circumferential direction of the gasket main body so as to be in close contact with the inner wall surface of any one of the cylinders 11 and 13. An accommodation groove 117 provided between the contact protrusion 115 and the upper plate 112 and formed to be recessed inwards by a predetermined depth in the circumferential direction of the gasket main body so as to accommodate the sealing member 120 therein.

An air residual groove 114 is formed between the side wall 113 and the contact protrusion 115 and is recessed inwards so as to allow air to remain therein. The air remaining between each of the bottom surface of the cylinders 11 and 13 and a corresponding one of the gaskets 100 and 100a is moved upwards when the silicone base L1 or the hardener L2 is injected from a lower portion of the impression material cartridge and remains in the air residual groove 114.

Here, a height h1 of the accommodation groove 117 is formed to be higher than a thickness h2 of the sealing member 120. In particular, the accommodation groove 117 is formed to have a height of 1.5 to 1.8 times the thickness h2 of the sealing member 120. As described above, the height of the accommodation groove 117 is formed to be higher than the thickness of the sealing member 120, as shown in FIG. 3. As a result, when the sealing member 120 is inserted into the accommodation groove 117, the accommodation groove 117 has predetermined height gaps respectively formed at an upper portion of the accommodation groove and a lower portion thereof.

Accordingly, as shown in the enlarged view of FIG. 5(a), when the sealing member 120 is located at the upper portion of the accommodation groove 117, the air vent hole 119 is blocked by the sealing member, thereby preventing the air A from being discharged to the outside. Further, as shown in the enlarged view of FIG. 6(b), when the sealing member 120 is located at a lower portion of the accommodation groove 117, the air vent hole 119 is opened, thereby enabling the air (A) to be discharged to the outside.

The air vent hole 119 is formed to extend from the contact protrusion 115 to the accommodation groove 117 so as to selectively discharge the internal air A to the outside depending on the position of the sealing member 120 in the accommodation groove. At least one air vent hole 119 is formed in the circumferential direction of the contact protrusion 115.

Each of the gaskets 100 and 100a according to the preferred embodiment of the present invention has a pair of air vent holes 119 respectively provided in opposite sides of the contact protrusion 115 and formed to face each other, but this structural configuration is only an example, and the number of air vent holes may be increased or reduced.

The air vent hole 119 includes, as shown in FIG. 4, an air inlet groove 119a formed to be recessed by a predetermined depth from the contact protrusion 115 and configured to communicate with the air residual groove 114, an air discharge groove 119b formed to be recessed in the accommodation groove 117 and configured to discharge air, and an air movement groove 119c configured to connect the air inlet groove 119a to the air discharge groove 119b.

The air inlet groove 119a is formed to be recessed by a predetermined height perpendicular to the contact protrusion 115 such that the air A remaining in the air residual groove 114 is moved to the air movement groove 119c.

A height h3 from the air movement groove 119c formed in the accommodation groove 117 to the air discharge groove 119b is formed to be higher than the thickness h2 of the sealing member 120. Accordingly, as shown in FIG. 6(a) and FIG. 6(b), when the sealing member 120 is located at a lower portion of the accommodation groove 117, the air discharge groove 119b may be exposed to an upper portion of the sealing member 120 so as to discharge the air A to the outside.

The sealing members 120 are respectively inserted into the accommodation grooves 117 to be in close contact with the respective inner wall surfaces of the cylinders 11 and 13 when the gaskets 100 and 100a are respectively moved upwards and downwards in the cylinders 11 and 13, thereby making it possible to prevent the silicon base L1 and the hardener L2 in the respective cylinders from leaking to the outside.

The sealing member 120 is formed of a material such as rubber or silicone. The gasket main body 110 is formed of a plastic material having reliable processability and strength capable of withstanding a certain amount of force.

When the silicone base L1 and the hardener L2 are respectively injected into the cylinders 11 and 13 using the impression material injector 30, the gaskets 100 and 100a are moved upwards by injection pressure. In this case, since the gasket main body 110 made of a plastic material and the sealing member 120 made of a rubber material have different frictional forces, the gasket main body 110 is first moved upwards, and the sealing member 120 is moved later with a time difference therebetween.

The gaskets 100 and 100a of the present invention respectively discharge the air A through the air vent holes 119 respectively formed in the gaskets by using a time difference generated when the gasket main body 110 and the sealing member 120 are moved.

Figure 5:
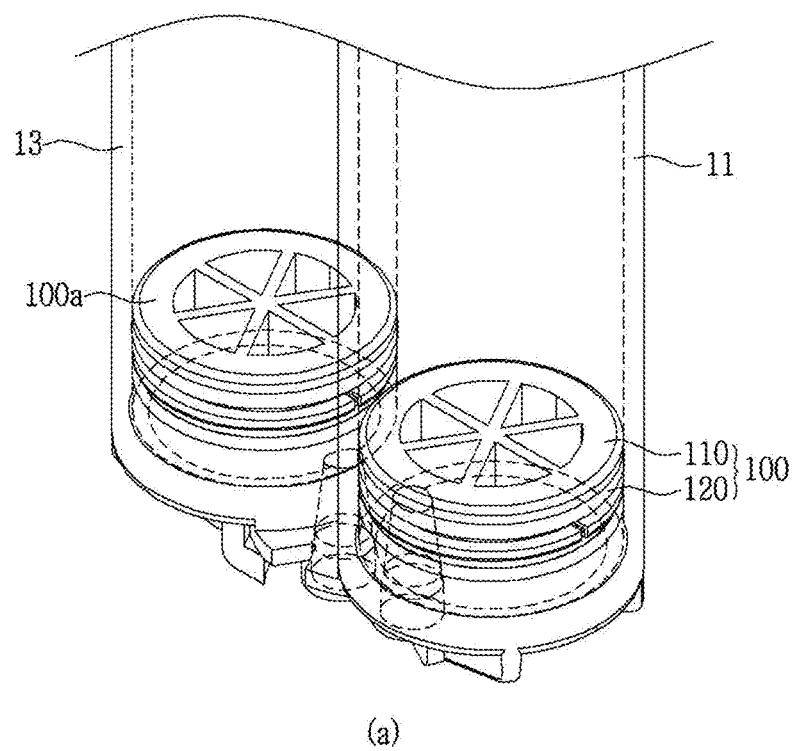
FIGS. 5 and 6 are exemplary views each showing a process of discharging air from the gasket of the present invention during injection of an impression material.
Figure 5:
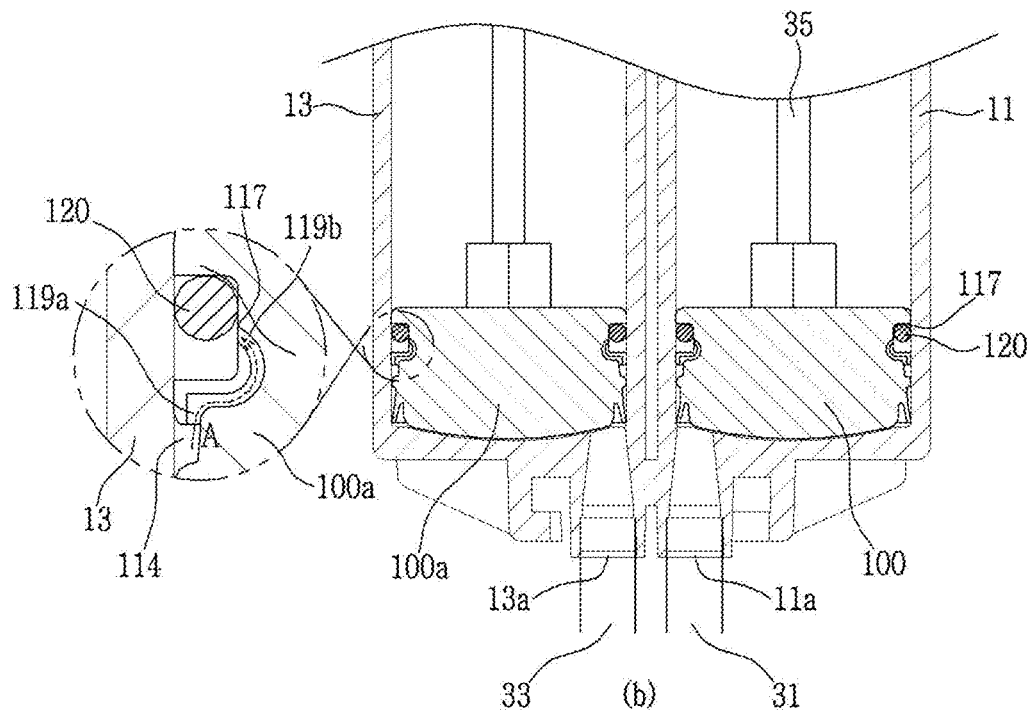
Figure 6:
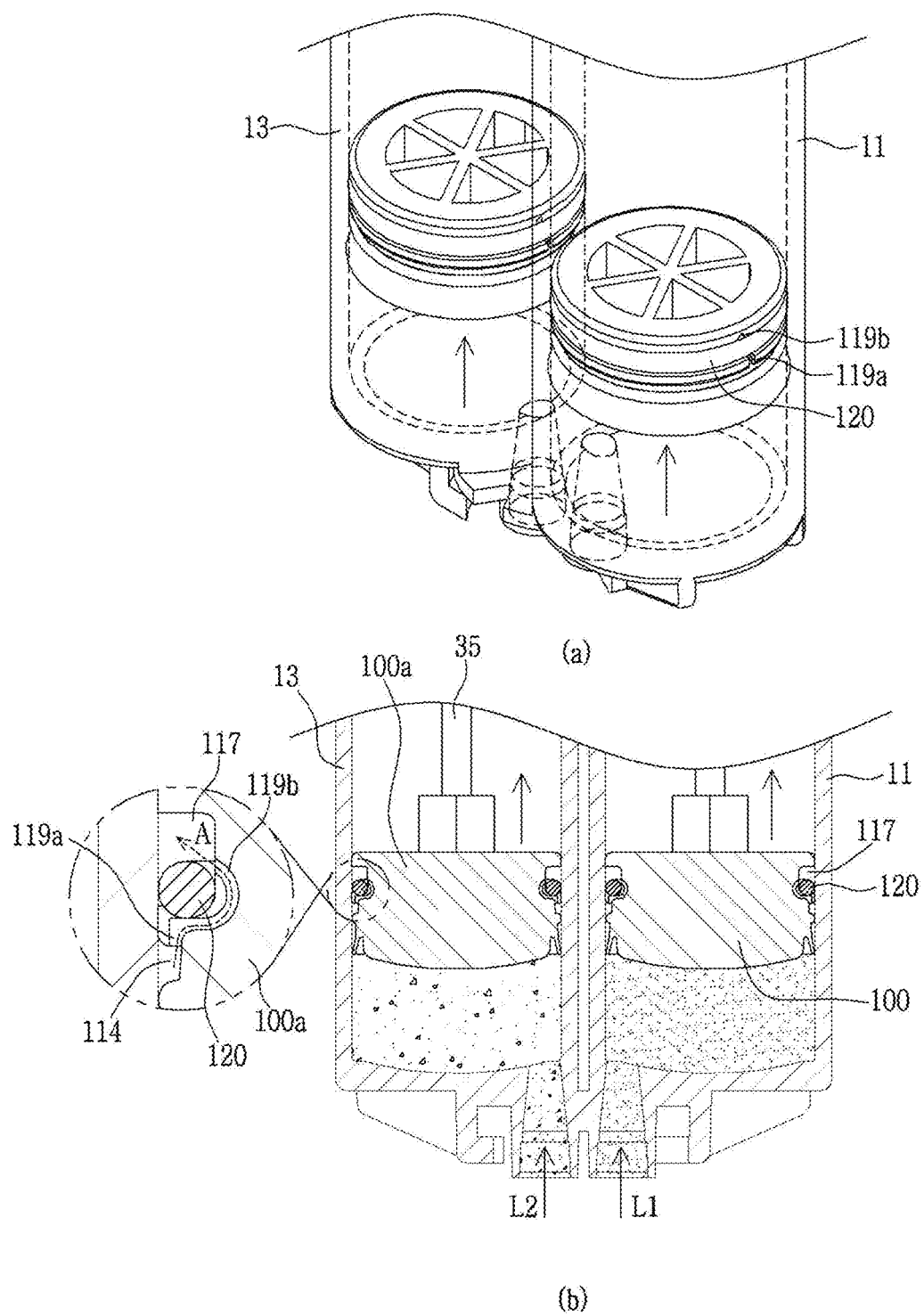

A description will be given as to a process of discharging, through the gaskets 100 and 100a, the air when the impression material is injected into the impression material cartridge 10 with reference to FIGS. 5 and 6.

The impression material cartridge 10 is coupled to the impression material injector 30, and a base injection nozzle 31 and a hardener injection nozzle 33 are respectively inserted into the base discharge hole 11a and the hardener discharge hole 13a. The gaskets 100 and 100a respectively located in the base cylinder 11 and the hardener cylinder 13 are located on the bottom surface.

In this case, as shown in FIG. 5(a) and FIG. 5(b), the sealing member 120 is located at an upper portion of the accommodation groove 117 of the gasket main body 110. Here, the height h1 of the accommodation groove 117 is less than twice the thickness h2 of the sealing member 120, and the air discharge groove 119b is disposed higher than the height of the sealing member 120. Accordingly, when the sealing member 120 is located at the upper portion of the accommodation groove 117, the air discharge groove 119b is blocked by the sealing member 120.

Accordingly, the air A moved to the air movement groove 119c through the air residual groove 114 is blocked by the sealing member 120 and is not discharged to the outside. That is, the air remains in the air movement groove.

When the silicone base L1 and the hardener L2 are injected, the gaskets 100 and 100a are respectively moved upwards in the cylinders 11 and 13 by injection pressure. In the above-mentioned process, as shown in FIG. 6(a) and FIG. 6(b), the gasket main bodies 110 each having a small frictional force relative to a corresponding one of the inner wall surfaces of the cylinders 11 and 13 are moved upwards first, and the sealing members 120 each having a large frictional force relative thereto are moved upwards later.

When the gasket main bodies 110 are moved upwards first in a state in which the respective positions of the sealing members 120 are fixed, the sealing members 120 are located at the respective lower portions of the accommodation grooves 117. As shown in the enlarged view of FIG. 6(b), when the sealing members 120 are located at the respective lower portions of the accommodation grooves 117, the respective air discharge grooves 119b in the air vent holes 119 are exposed to the outside of the accommodation grooves 117, and the air A remaining in each of the gaskets is discharged to the outside.

When the air A is discharged to the outside, the sealing members 120 are also moved upwards in conjunction with upward movement of the gaskets 100 and 100a in a state of being located at the respective lower portions of the accommodation grooves 117. Accordingly, all the air A remaining in each of the gaskets may be discharged to the outside.

As described above, the present invention provides an impression material cartridge gasket configured to form an air vent hole in a sealing member accommodation groove, and to discharge air remaining in the impression material cartridge gasket to the outside by using a time difference generated when a gasket main body and a sealing member are respectively moved by different frictional forces thereof.

As a result, since all the air remaining in the impression material cartridge gasket is discharged when an impression material is injected into an impression material cartridge, an additional process of discharging the air is not required in the subsequent process, thereby having an effect of preventing defects generated in the process of impression taking.

The embodiment of the impression material cartridge gasket according to the present invention described above is exemplary only, and a person having ordinary skill in the art to which the present invention pertains will recognize that various modifications and other equivalent embodiments are possible therefrom. It will therefore be well understood that the present invention is not limited to the form recited in the above detailed description. Consequently, the true scope of technical protection of the present invention is to be determined by the technical ideas of the appended claims. In addition, the present invention is to be understood to include all variations, equivalents, and substitutes within the spirit and scope of the present invention as defined by the appended claims.

DESCRIPTION OF REFERENCE SYMBOLS

10: Impression material cartridge
11: Base cylinder
11a: Base discharge hole
13: Hardener cylinder
13a: Hardener discharge hole
20: Sealing member
30: Impression material injector
31: Base injection nozzle
33: Hardener injection nozzle
35: Support shaft
100: Gasket
110: Gasket main body
111: Lower surface
112: Upper plate
113: Side wall
114: Air residual groove
115: Contact protrusion
117: Accommodation groove
119: Air vent hole
119a: Air inlet groove
119b: Air discharge groove
119c: Air movement groove
120: Sealing member
A: Air
L1: Silicone base
L2: Hardener

The invention claimed is:

1. An impression material cartridge gasket comprising:
a gasket main body (110) moved upwards and downwards along an inner wall surface of a cylinder depending on injection and discharge of a liquid chemical; and
a sealing member (120) coupled to an outer circumferential surface of the gasket main body (110) and configured to prevent leakage of the liquid chemical, wherein:
the gasket main body (110) comprises:
a contact protrusion (115) formed to protrude radially outwards in a height direction of a side wall (113) and configured to contact the inner wall surface of the cylinder;
an air residual groove (114) formed to be recessed radially inwards at a lower portion of the contact protrusion (115) and configured to allow air to remain therein; and
an accommodation groove (117) formed to be recessed radially inwards between an upper surface of the gasket main body (110) and the contact protrusion (115), the accommodation groove allowing the sealing member (120) to be coupled thereto, and
the contact protrusion (115) has at least one air vent hole (119) provided circumferentially on a plate surface thereof, wherein the at least one air vent hole is formed to be recessed toward the accommodation groove (117) by a predetermined depth so as to discharge the air remaining in the air residual groove (114) to an outside of the impression material cartridge gasket.

2. The impression material cartridge gasket according to claim 1, wherein:
the accommodation groove (117) is formed to have a height of 1.5 to 1.8 times a thickness of the sealing member (120),
the air vent hole (119) comprises:
an air inlet groove (119a) formed to be vertically recessed from the contact protrusion (115) toward the air residual groove (114), the air inlet groove allowing the air remaining in the air residual groove (114) to be introduced thereinto;
an air movement groove (119c) formed to extend from the air inlet groove (119a), the air movement groove being recessed toward a plate surface of the accommodation groove (117); and
an air discharge groove (119b) provided at an end portion of the air movement groove (119c) and formed to be open toward the accommodation groove (117), the air discharge groove discharging the air moved along the air movement groove (119c) to the outside of the impression material cartridge gasket, and
the discharge groove (119b) is formed to be higher than the thickness of the sealing member (120) from a bottom portion of the accommodation groove (117).

* * * * *